United States Patent [19]  [11] Patent Number: 4,780,279
Enos  [45] Date of Patent: Oct. 25, 1988

[54] APPARATUS AND METHOD FOR FUMIGATION AND DETOXIFICATION OF PLANT SEED

[75] Inventor: Quentin M. Enos, Chandler, Ariz.

[73] Assignee: Toltec Corporation, Phoenix, Ariz.

[21] Appl. No.: 38,301

[22] Filed: Apr. 14, 1987

[51] Int. Cl.$^4$ .............................. A01C 1/06; A23L 3/34; G05D 16/00

[52] U.S. Cl. ........................................ 422/32; 422/28; 422/111; 422/112; 422/295; 47/57.6; 47/DIG. 9; 426/320; 426/419

[58] Field of Search ............................ 422/28, 31–33, 422/111, 112, 295, 304; 426/316, 318–320, 419; 406/47, 48; 47/57.6, DIG. 9

[56] References Cited

U.S. PATENT DOCUMENTS

| | | | |
|---|---|---|---|
| 1,973,450 | 9/1934 | Trunsky | 422/32 |
| 2,318,576 | 5/1943 | Arnold | 426/419 |
| 3,429,709 | 2/1969 | Masri et al. | 426/319 |
| 3,481,686 | 12/1969 | Ivnäs et al. | 422/32 |

FOREIGN PATENT DOCUMENTS

| | | | |
|---|---|---|---|
| 1273467 | 7/1968 | Fed. Rep. of Germany | 406/48 |
| 2934087 | 3/1981 | Fed. Rep. of Germany | 406/48 |
| 2085392 | 4/1982 | United Kingdom | 426/316 |

OTHER PUBLICATIONS

Amos, T. G. et al, "Use of Synergised Pyrethrins to Protect Processed Sultanas from Insect Attack" Pyrethrin Post (14) 3, p. 76.
Amos, T. G., et al, "Laboratory Evaluation of Pyrethrins for Use on Processed Sultanas as a Protectant Against Insect Infestation" Pyrethrin Post (14)3, p. 72.
Dove, W., "Piperonyl Butoxide and Pyrethrins for the Protection of Grains and Similar Products from Insect Damage." Trans. Ninth Int. Congr. Ent., vol. 1, 1952, p. 875.
Dove, W. E. et al, "Protection of Stored Grain with Sprays of Pyrethrins–Piperonyl Butoxide Emulsion", Agric. and Food Chem. (3) 11, Nov. 1955, p. 932.
Jorgensen, K. V. et al, "Atmospheric Pressure–Ambient Temperature Reduction of Aflatoxin $B_1$ in Ammoniated Cottonseed", J. Agric. Food Chem. (29) (3), 1981, p. 555.
Price, R. L., et al, "Ammoniation of Whole Cottonseed at Atompsheric Pressure and Ambient Temperature to Reduce Aflatoxin $M_1$ in Milk", J. Food Protection, (45)4, Mar. 1982, p. 341.
Applebaum, R. S. et al, "Aflatoxin: Toxicity to Dairy Cattle and Occurrence in Milk and Milk Products, A Review,", J. Food Protection (45)8, Jun., 1982, p. 752.
Price, R. L., et al, "Citrus Artiface Interference in Aflatoxin $M_1$ Determination in Milk," J. Assoc. Off. Anal. Chem. (64)6, 1981, p. 1383.

Primary Examiner—Barry S. Richman
Assistant Examiner—Jill Johnston
Attorney, Agent, or Firm—David G. Rosenbaum; Harry M. Weiss

[57] ABSTRACT

The present invention relates to a method of fumigation and detoxification of plant seed and to an pneumatic apparatus having a positive pressure air source, seed feed, a vacuum wheel air lock, fumigant and detoxicant source, a spraying apparatus for introducing the fumigant and/or the detoxicant and an exit cyclone having an optional air return for returning fumigant and/or detoxicant saturated air to the apparatus. The inventive apparatus and method have been found effective for aflatoxin $B_1$ and $B_2$ suppression as well as for insect extermination in infested plant seed.

17 Claims, 2 Drawing Sheets

APPARATUS AND METHOD FOR FUMIGATION AND DETOXIFICATION OF PLANT SEED

BACKGROUND OF THE INVENTION

The present invention relates generally to an apparatus and method for the fumigation and detoxification of plant seed such as rice, corn, cottonseed, soybeans, peanuts, wheat, barley and other seeds. More particularly, the present invention relates to a pneumatic apparatus having a positive pressure air source, seed feed, a vacuum wheel air lock, fumigant and detoxicant source, a spraying apparatus for introducing the fumigant and/or the detoxicant and an exit cyclone having an optional air return for returning fumigant/detoxicant saturated air to the apparatus. Further, the inventive apparatus and method have been found effective for aflatoxin $B_1$ and $B_2$ suppression as well as for extermination of pink boll worm and weevils which commonly infest and contaminate the nation's seed supply and food chain. In addition to the efficacious fumigant and detoxicant activity of the present invention, increases in nutrient values of the treated seeds has been noted.

At present time conventional means for fumigation and detoxication of the nation's seed supply has been accomplished by employing the highly toxic chemicals phostoxin and methyl bromide. Despite their inherent toxicity these two chemicals are the major fumigants and detoxicants currently employed by growers and/or seed treatment facilities to comport with the U.S. Department of Agricultural (hereinafter "USDA") regulations and requirements for qualification for the Phyto-Sanitary Certificate of Approved Fumigation which is required for interstate transport of treated seed.

Current methodology and regulation mandates, for example, that cotton planting seed stored for interstate transport must be covered, treated and retained in such state for at least five days before transportation from the storage area. The five day retention period has been found to be the optimum time permissible for insuring safe levels of residual phostoxin or methyl bromide toxicity. This retention period had been tremendously burdensome to cotton gins which do not have endless seed storage capacity and must, at times, abandon or ignore proper storage procedures.

Planting and feed seed growers have, accordingly, suffered significant loss of revenue due to the regulatory storage period to insure safe levels of phostoxin and methyl bromide toxicity levels upon interstate transport of the seed. It has been found desirable, therefore, to eliminate these commonly employed toxic chemicals, as the major fumigants and detoxicants for seed treatment. Moreover, it has been determined that by employing alternative fumigants and detoxicants having less toxicity, the requisite seed retention period may be reduced from five days to a period of forty-eight to seventy-two hours. This reduced storage period results in far quicker turnaround times for the seed growers as well as the seed transporters in interstate commerce.

In accordance apparatus and method of fumigation and detoxification of seeds, the present invention has been found to achieve a more complete effective coating of each seed with a concomitant increase in fumigant and detoxicant activity. It well known that ammonia, in various forms, exhibits aflatoxin suppression activity in cottonseed at ambient temperature and pressure. See, e.g., Jorgensen, K. V., et al, "Atmospheric Pressure-Ambient Temperature Reduction of Aflatoxin $B_1$ in Ammoniated Cottonseed," *J. Agric. Food Chem.*, Vol 29, No. 3, p. 555; Price, R. L., et al, "Ammoniation of Whole Cottonseed at Atmospheric Pressure and Ambient Temperature to Reduce Aflatoxin $M_1$ in Milk," *J. Food Protection*, Vol. 45, March, 1982, p. 341; and U.S. Pat. No. 3,429,709 issued Feb. 25, 1969 to Masri, et al. entitled "Process for De-Toxifying Substances Contaminated with Aflatoxin". Heretofore, however, it has been found exceedingly difficult to employ anhydrous ammonia in a detoxification system operating at ambient temperature and pressure. The principal problem encountered with ammoniation treatment to detoxify aflatoxin contaminated seed has been pH control. It is well known that an overly alkaline or overly acidic pH will rapidly degrade the nutrient value of the seed or kill it altogether. Furthermore, an overly alkaline pH causes alkaline hydrolysis which causes rapid decomposition of fumigants or pesticides commonly applied prior to, concurrently with, or shortly after treatment with the ammonia detoxicant. As a result of this difficulty in pH control, there has been an inability on the part of those skilled in the art to develop an apparatus and method of detoxification and fumigation which effectively reduces the seed storage time and significantly increases fumigant activity and duration.

Apart from aflatoxin suppression, a principal concern to seed producers is insect damage during storage. Frequently, large amounts of seed will be stored for periods up to a year, during which time, the vast majority of the seed is exposed to insect infestation and damage. The annual monetary losses resulting from insect damage have, for a considerable time, been substantial and continue to mount. Accordingly, seed producers have sought, for a long period of time, an effective fumigant having a long lasting fumigant activity to protect the seed from insect infestation during its period of storage. Currently, the majority of seed producers are employing the toxic, though USDA approved, chemicals phostoxin and methyl bromide to control insect infestation in stored seed. However, these chemicals are highly toxic and exceedingly dangerous to handle.

It is well known, to those skilled in the art, that organic pyrethrins exhibit potent fumigant activity and protect seeds and grains from insect damage while exhibiting lower toxicity to humans than phostoxin and methyl bromide. Organic pyrethrin has been mixed with piperonyl butoxide, a synergist, in both water and oil based emulsions to achieve a protective biocidal activity for up to one year when applied to various grains and fruits. See, e.g., Dove, W. E. et al, "Protection of Stored Grain with Sprays of Pyrethrins-Piperonyl Butoxide Emulstion," *Agric. and Food Chem*, Vol. 3, No. 11, November 1955 pp. pp 932-936; Dove, W. E., "Piperonyl Butoxide and Pyrethrins for the Protection of Grains and Similar Products from Insect Damage," *Trans. Ninth Int. Congr. Ent.*, Vol. 1, 1952, pp. 875-879; Amos, T. G., et al., "Laboratory Evaluation of Pyrethrins for use on Processed Sultanas as a Protectant against Insect Infestation," *Pyrethrum Post*, Vol. 14, No. 3, pp. 72-75; and Amos, T. G., et al., "Use of Synergised Pyrethrins to Protect Processed Sultanas from Insect Attack," *Pyrethrum Post*, Vol. 14, No. 3, pp. 76-78.

Heretofore, however, it has been found exceedingly difficult to employ a pyrethrin/piperonyl butoxide fumigant in high volume commercial applications. The primary difficulties encountered in translating laboratory data to commercial application of organic pyrethrins as a fumigant for stored grain, have been pH control, a high susceptibility to alkaline hydrolysis and instability in air and sunlight.

SUMMARY OF THE INVENTION

Accordingly, it is an object of the present invention to provide a system for the fumigation and detoxification of plant seeds, including rice, corn, cottonseed, soybeans, peanuts, wheat, barley and other seeds.

It is another object of the present invention to provide a system for ammoniation of the seed with anhydrous ammonia, at ambient temperatures and pressures, for aflatoxin suppression.

It is a further object of the present invention to provide a commercially useful system for ammoniation of plant seed with anhydrous ammonia in an pneumatic drive apparatus having a vacuum wheel air lock, a positive pressure air source, seed feed, a fumigant and detoxicant source, a spraying apparatus for introducing the anhydrous ammonia and an exit cyclone having an optional air return for returning ammonia-saturated air to the apparatus.

It is a still further object of the present invention to provide a commercially useful system for aflatoxin suppression by ammoniation of plant seed wherein the anhydrous ammonia spray is automatically controlled by pressure-feed back controls from the treatment chamber to the ammonia source with a manual by-pass control.

It is yet another object of the present invention to provide a commercially useful system for fumigation of plant seed with organic pyrethrins.

It is a further object of the present invention to provide a commercially useful system for fumigation of plant seed with organic pyrethrins in conjunction with aflatoxin suppression by treatment with anhydrous ammonia in an pneumatic drive apparatus having a vacuum wheel air lock, a positive pressure air source, seed feed, a fumigant and detoxicant source, a spraying apparatus for introducing the organic pyrethrin and/or anhydrous ammonia and an exit cyclone having an optional air return for returning ammonia-saturated air to the apparatus.

These and other objects, features and advantages hereinafter disclosed, will become more apparent from the following, more particular, description of the preferred embodiments of this invention, as illustrated in the accompanying drawings, wherein like features are identified by like reference numerals.

BRIEF DESCRIPTION OF THE ACCOMPANYING DRAWINGS

DESCRIPTION OF THE PREFERRED EMBODIMENT

Figure 1:
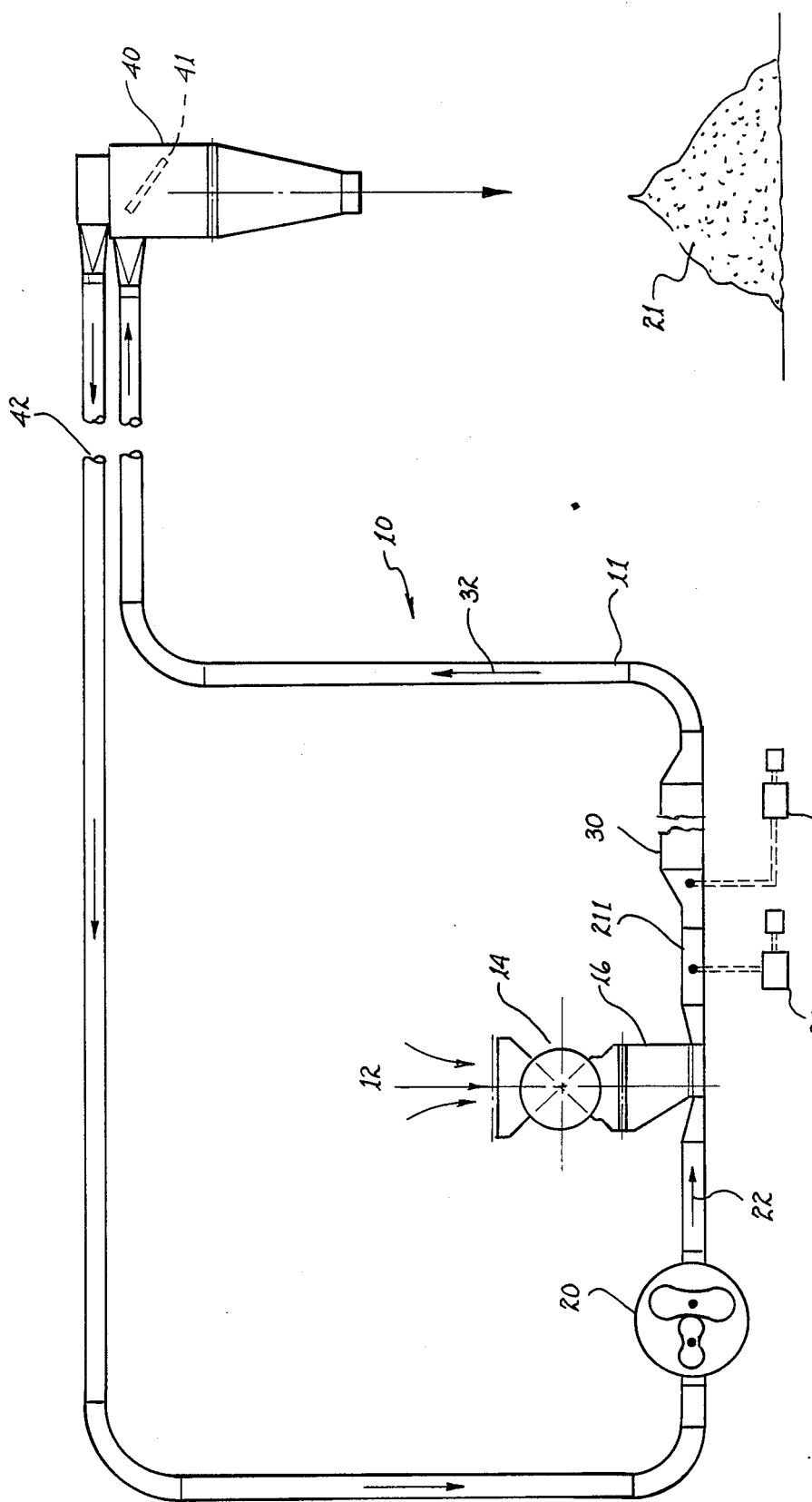
FIG. 1 is a diagrammatic view of the fumigation and detoxification system according to the present invention.

With reference to the accompanying Figures, there is shown a typical gin stand 10 having a seed input 12 which may be any conventional screw-type or pneumatic conveyor. The seeds are transported from seed input 12 to a conventional vacuum wheel air lock 14 for introduction into the system through venturi chamber 16. A positive pressure air source 20 generates pre-treatment air flow 22 which draws the seed to be treated into the system.

Once the seed is transported into pre-treatment air flow 22, it is optionally exposed to a conventional wetting agent, such as a water-based emulsion, to facilitate penetration of the fumigant/detoxicant into the seed hull. Moisture injection means 24 for application of a suitable wetting agent is provided downstream from the point of introduction of the seed into pre-treatment air flow 22. The means for introduction of the biocidal agent or agents is provided downstream from moisture injection means 24. Fumigant/detoxicant input means 26 is disposed downstream from moisture injection means 24 and immediately before an expansion chamber 30. It has been found desirable to introduce the fumigant/detoxicant at a pressure transition point in pre-treatment air flow 22. Expansion chamber 30 is provided as a means for providing a point of relatively lower air pressure in the system 10 as compared with the slightly elevated pressure created by pre-treatment air flow 22. In this manner, the seed transported in pre-treatment air flow 22 is blown into the lower pressure of expansion chamber 30 thereby providing each seed with a greater exposure to the fumigant/detoxicant. In this manner a more effective coating of the biocidal agent is applied to each plant seed to minimize the likelihood of aflatoxin growth or insect infestation.

Downstream from expansion chamber 30, post-treatment air flow 32 transports the treated seed to cyclone 40 having a seed outlet to permit the treated seed to exit from the system 10 to a seed pile or storage chamber. According to the preferred embodiment of the present invention, cyclone 40 has a diverter 41, shown in phantom, which diverts treated seed in post-treatment air flow 32 toward the seed outlet of cyclone 40 while exhausting the inlet air from post-treatment air flow 32 to an air return line 42 which returns fumigant/detoxicant saturated air to the air source 20 for re-introduction into the system 10. The post-treatment air flow 32 delivers the seed to the cyclone 40 for deposition onto the seed pile 21.

Figure 2:
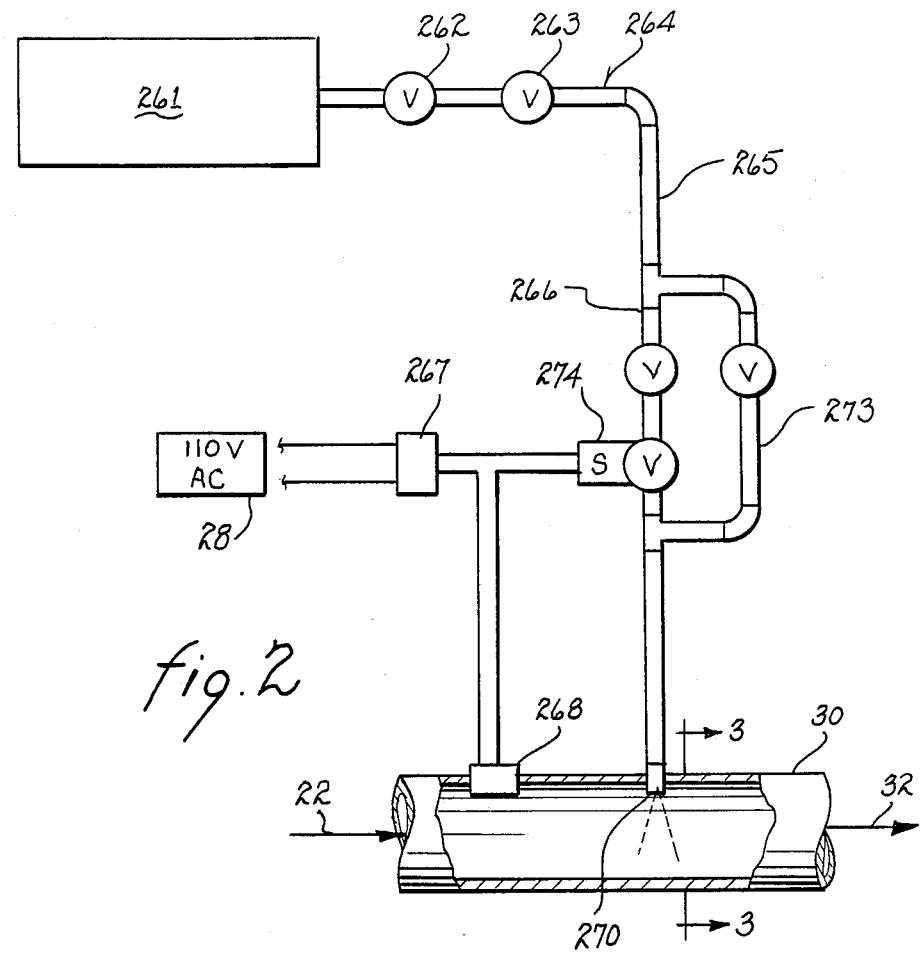
FIG. 2 is a schematic view of the fumigant/detoxicant input and automated controls depicted in FIG. 1, according to the present invention.
Figure 3:
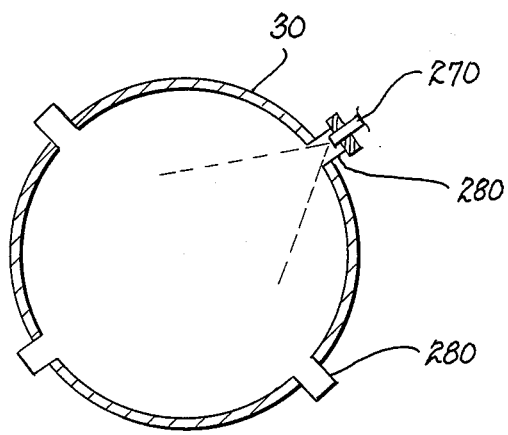
FIG. 3 is a planar section taken along line 3—3 of FIG. 2 and illustrates the injection mechanism of the present invention.

According to the present invention, both moisture injection means 24 and fumigant/detoxicant injection means 26 comprise automated and manual by-pass systems as depicted in FIG. 2. A storage tank 261 for holding the liquid to be dispensed, either the moisturizing agent, the detoxicant or the fumigant supplies a service hose 264 by means of a metering valve 262 with an excess flow safety valve 263. The liquid to be dispensed flows through service pipe 265 and through first and second conduit legs 266 and 273, respectively, each is equipped with a ball valve having seals appropriate to the liquid to be dispensed. Fist conduit leg 266 is the normal automatic mode utilizing an air pressure activated solenoid valve 274, while second conduit leg 273 provides for a manual operating mode for automatic mode by-pass. Air pressure activated solenoid valve 274 operates at 12–24 Volts DC, and is coupled to a 110 Volts AC to 12–24 VDC transformer 28 which is, in turn supplied with an alternating electrical current. Air pressure activated solenoid valve 274 is activated by an adjustable air pressure sensor 268 which senses the air pressure created by air flow 22 in the system at an upstream point immediately prior to the injection point.

This arrangement of pressure sensor 268 and solenoid valve 274 provides a pressure-feed back control for the introduction of the liquid to be dispensed into pre-treatment air flow 22 for the treatment of the seed transported therein. The liquid to be dispensed, the wetting agent, the fumigant or the detoxicant, is actually injected into the system by means of a plurality of spray nozzles 270 disposed around the circumference of transport pipe 211 and in expansion chamber 30. Ideally, each of the plurality of spray nozzles 270 has a spray pattern subtending a 45 degree angle so that the entire internal area of the treatment chamber, and thereby the entire supply of seed, is exposed to the liquid sprayed into the system. Spray nozzles 270 are disposed and retained within recesses 280 in either transport pipe 211 or expansion chamber 30, such that the spray nozzles 270 do not protrude into the seed path within either transport pipe 211 or expansion chamber 30.

When running the system with both ammoniation and pyrethrin treatment, it is important that a proper balance of moisture and ammonia be maintained to maintain a substantially neutral pH within the range of about 7.0–7.7. Control of the pH is crucial to the activity of the pyrethrin to prevent alkaline hydrolysis of the organic molecule thereby rendering the pyrethrin an ineffective fumigant.

In operation, it has been found that anhydrous ammonia exhibits activity both as a detoxicant as well as a fumigant. However, in combination with organic pyrethrins, a known fumigant, the biocidal activity of the present invention is significantly enhanced. The present system offers the ability to both detoxify and fumigate plant seed by having the capability of treating the seed substantially concurrently with both anhydrous ammonia an organic pyrethrins.

It has been found that the present system can treat 6 to 7 tons of seed per hour while exhibiting lower water requirements and requiring only one gallon or organic pyrethrin per 3,000 tons of seed. In ammoniation detoxification tests run with the present system, up to 77% reduction in Aflatoxin $B_1$ and up to 100% reductions in Aflatoxin $B_2$ were noted with cottonseed. In ammoniation fumigation tests run with the present system on pink boll worm pupae having a control emergence rate of 98–99%, after fumigation with ammonia, a 46% normal emergence rate was noted, with a 16% deformed emergence rate and a 33% non-emergence rate. When combined ammoniation and pyrethrin treatment is to be utilized as a fumigation treatment, greater non-emergence or deformed emergence rates are to be expected.

While the invention has been particularly shown and described in reference to the preferred embodiments thereof, it will be understood by those skilled in the art that changes in form and details may be made without departing from the spirit and scope of the invention.

I claim:

1. A plant seed fumigation, nutrification and detoxification system, comprising:
   a first seed conduit receivably having a seed inlet;
   coneyor means for transporting plant seed to said inlet;
   air supply pumping means for pumping ambient air into and creating positive air pressure in said first seed conduit;
   feeder means for directing the plant seed from said seed inlet of said conveyor means into said first seed conduit having the positive air pressure created therein;
   a treatment area connected to said first seed conduit and in air flow communication therewith, said treatment area comprising an expansion chamber defining an area of air pressure lower than that in said first seed conduit and consisting of a hollow member having an entrance opening and an exit opening, each of said entrance opening and exit opening having a diameter less than the diameter of said hollow member;
   treatment means for applying at least one of a fumigant and a detoxicant to the plant seed, said treatment means being disposed about the circumference of and in fluid communication with said entrance opening of said hollow member;
   a second seed conduit for transporting treated seed away from said treatment area; and
   a cyclone receivably coupled to said second seed conduit for receiving the treated seed therefrom and releasing the treated seed to a storage area.

2. The plant seed fumigation, nutrification and detoxification system according to claim 1, wherein said conveyor means further comprises a screw-type conveyor.

3. The plant seed fumigation, nutrification and detoxification system according to claim 1, wherein said conveyor means further comprises a pneumatic conveyor.

4. The plant seed fumigation, nutrification and detoxification system according to claim 1, wherein said air supply pumping means further comprises a positive displacement air pump.

5. The plant seed fumigation, nutrification and detoxication system according to claim 1, wherein said cyclone further comprises diverter means operably disposed therein for diverting treated seed to a seed outlet, exhausting air to an air return conduit and for coupling said cyclone to said air supply pumping means.

6. The plant seed fumigation, nutrification and detoxification system according to claim 1, wherein said first seed conduit further comprises moisture injection means for applying a wetting agent to the plant seed, said moisture injection means being operably coupled to said first seed conduit and disposed between said seed inlet and said treatment area.

7. The plant seed fumigation, nutrification and detoxification system according to claim 6, wherein said moisture injection means comprises a plurality of spray nozzles coupled to a source of a wetting agent, and a pressure feed-back control means, interdisposed and operably coupled therebetween, for regulating a flow of wetting agent from said source to said plurality of spray nozzles, said pressure feed-back control means having means for sensing an air pressure upstream from said moisture injection means in said first seed conduit, a solenoid valve operably connected to said means and disposed in a supply line of said source of said wetting agent.

8. The plant seed fumigation, nutrification and detoxification system according to claim 7, wherein said pressure feed-back control means further comprises an air pressure sensor switch disposed in said first seed conduit between said seed inlet and said moisture inlet means, said air pressure sensor switch being electrically coupled to said solenoid valve.

9. The plant seed fumigation, nutrification and detoxification system according to claim 1, wherein said treatment means further comprises a plurality of spray nozzles coupled to a source of at least one of a fumigant and detoxicant and a pressure feed-back control means interdisposed between said source and said plurality of spray nozzles for regulating a flow of said at least one of a fumigant and detoxicant from said source to said plurality of spray nozzles, wherein said pressure feed-back control means comprises means for sensing an air pressure in said first seed conduit proximate to said expansion chamber and a solenoid valve, operably connected thereto and disposed in a supply line from said source of at least one of a fumigant and detoxicant to said plurality of spray nozzles.

10. The plant seed fumigation, nutrification and detoxification system according to claim 9, wherein said means for sensing an air pressure further comprises an air pressure sensor switch means disposed in said first seed conduit and proximate to said expansion chamber, said air pressure sensor switch means being for sensing said positive air pressure in said first seed conduit and applying an electrical signal to actuate a solenoid valve disposed in a supply line from said source to said at least one of a fumigant and detoxicant, said solenoid valve being electrically coupled to said air pressure sensor switch means and to an electric source.

11. The plant seed fumigation, nutrification and detoxification system according to claim 9, wherein said at least one of a detoxicant and fumigant further comprises an organic pyrethrin.

12. The plant seed fumigation and detoxification system according to claim 9, wherein said at least one of a detoxicant and fumigant further comprise anhydrous ammonia.

13. A method for fumigating, nutrifying and detoxifying plant seed, comprising the steps of:
 transporting the plant seed into a first seed conduit;
 applying positive air pressure by pumping air from an air source into said first seed conduit thereby conveying the plant seed from said first seed conduit to a seed treatment area;
 sensing said positive air pressure in said first seed conduit;
 opening an air pressure sensing switch in response to said sensing of said positive air pressure, said air pressure sensing switch being electrically connected to a solenoid valve disposed in a source line for supplying at least one of a fumigant and a detoxicant from said source into said seed treatment area;
 opening said solenoid valve thereby flowing said at least one of a fumigant and a detoxicant through said source line and into said seed treatment area;
 moving the plant seed by said positive air pressure from said first seed conduit into an expansion chamber disposed in said seed treatment area;
 treating the plant seed with said at least one of a fumigant and a detoxicant in said expansion chamber of said seed treatment area; and
 transporting the treated plant seed to a storage area.

14. The method for fumigating, nutrifying and detoxifying plant seed according to claim 13, wherein said step of transporting the treated seed further comprises the steps of:
 transporting the treated seed to a cyclone having a seed outlet and diverter means for separating the treated seed from the positive pressure air flow;
 separating the treated seed from the positive pressure air flow; and
 exhausting and returning said separated positive pressure air flow to said source of air pumped into said first seed conduit.

15. The method for fumigating, nutrifying and detoxifying plant seed according to claim 13, wherein said step of treating the plant seed further comprises the step of spraying said at least one of a fumigant and a detoxicant onto the plant seed.

16. The method for fumigating, nutrifying and detoxifying plant seed according to claim 15, wherein said at least one of a fumigant and a detoxicant further comprises anhydrous ammonia.

17. The method for fumigating, nutrifying and detoxifying plant seed according to claim 15, wherein said at least one of a fumigant and detoxicant further comprises an organic pyrethrin.

* * * * *